(12) United States Patent
Stone (10) Patent No.: US 7,142,751 B2
(45) Date of Patent: Nov. 28, 2006

(54) METHODS AND SYSTEMS FOR CHROMATIC DISPERSION COMPENSATION IN SWITCHED GRATING WDM DEVICES

(75) Inventor: Thomas W. Stone, Hellertown, PA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/717,326

(22) Filed: Nov. 18, 2003

(65) Prior Publication Data
US 2005/0105851 A1    May 19, 2005

(51) Int. Cl.
    *G02B 6/34*    (2006.01)
(52) U.S. Cl. .................. 385/37; 359/558; 359/566; 359/569
(58) Field of Classification Search .......... 385/24, 385/123, 37, 71, 74
    See application file for complete search history.

(56) References Cited

U.S. PATENT DOCUMENTS

| | | | |
|---|---|---|---|
| 3,988,614 A * | 10/1976 | Kapron et al. | 250/227.12 |
| 4,834,474 A | 5/1989 | George et al. | |
| 5,414,540 A * | 5/1995 | Patel et al. | 349/196 |
| 5,771,320 A | 6/1998 | Stone | |
| 6,072,923 A | 6/2000 | Stone | |
| 2002/0114090 A1 * | 8/2002 | Shirasaki et al. | 359/868 |
| 2002/0176659 A1 * | 11/2002 | Lei et al. | 385/24 |
| 2003/0021526 A1 * | 1/2003 | Bouevitch | 385/24 |

OTHER PUBLICATIONS

U.S. Appl. No. 10/700,828 filed Nov. 4, 2003. Applicant: Thomas W. Stone. Title: Wavelength Selective Switching and/or Routing System.

* cited by examiner

*Primary Examiner*—Frank G. Font
*Assistant Examiner*—James P. Hughes (57) ABSTRACT

Methods and system for chromatic dispersion compensation in disperser-combiner optical systems. The chromatic dispersion in disperser-combiner optical systems is substantially compensated by, after separating the input optical radiation into distinct chromatic components, propagating the distinct chromatic components through the optical system so that a pre-selected relationship between optical path lengths through the optical systems of the distinct chromatic components is obtained, where the pre-selected relationship substantially compensates the chromatic dispersion. The pre-selected relationship is obtained by reflecting the distinct chromatic components from a suitably placed and shaped pixellated optical volume reflector. After propagating through the optical system, the distinct chromatic components are recombined.

20 Claims, 4 Drawing Sheets

METHODS AND SYSTEMS FOR CHROMATIC DISPERSION COMPENSATION IN SWITCHED GRATING WDM DEVICES

BACKGROUND OF THE INVENTION

This invention relates generally to wavelength division multiplexed optical communications systems, and more particularly to the compensation for chromatic dispersion in such systems.

With the advent of substantial new uses for electro/optic systems, there exists a greater need to effectively control the multiplexing, demultiplexing and routing of signals that are Wavelength Division Multiplexed (WDM), and Dense Wavelength Division Multiplexed (DWDM), on optical fibers. Among the operations required in managing such WDM and DWDM systems are addition of signals into empty channels (Add) and selection of signals from populated channels (Drop), split, or route signals of different channels (separate an array of input channels into even and odd channels or into bands of channels, interleaving and band channelizing), and cross connecting from m channels to n channels (mxn cross-connect).

A common and well known problem in the transmission of optical signals, present in many of the operations required in managing such WDM systems, is chromatic dispersion of the optical signal. Chromatic dispersion refers to the effect where different signals within a channel travel through a system with different spatio-temporal properties, i.e., longer wavelengths have different travel times than shorter wavelengths. When gratings are used to separate or combine the channels propagating through a system, the system design must account for the inflexibility of temporal delay functions achievable with planar gratings. These temporal delays are approximately linear (as a function of frequency) over small spectral bands, but marked nonlinearities are introduced when the spectrum of the pulse becomes broad.

In typical switched grating systems used in the operations required in managing WDM systems, not only is the chromatic dispersion significant but it varies with wavelength and is larger in the longer wavelength edge of the bands.

It is therefore an object of this invention to provide methods and systems switching/routing optical systems.

It is a further object of this invention to provide methods and systems for compensating the chromatic dispersion in twin grating disperser-combiner switchable grating optical systems.

BRIEF SUMMARY OF THE INVENTION

The objects set forth above as well as further and other objects and advantages of the present invention are achieved by the embodiments of the invention described hereinbelow.

In this invention, the chromatic dispersion in disperser-combiner optical systems is substantially compensated by, after separating the input optical radiation into distinct chromatic components, propagating the distinct chromatic components through the optical system so that a pre-selected relationship between optical path lengths through the optical systems of the distinct chromatic components is obtained, where the pre-selected relationship substantially compensates the chromatic dispersion. The pre-selected relationship is obtained by reflecting the distinct chromatic components from a suitably placed and shaped pixellated optical volume reflector. After propagating through the optical system, the distinct chromatic components are recombined.

An optical system that implements the above described method of this invention includes an optical separating sub-system capable of separating input optical radiation into distinct chromatic components, an optical recombining sub-system capable of recombining the distinct chromatic components, and, a volume optical reflector capable of reflecting the distinct chromatic components and providing, through reflecting, a pre-selected relationship between optical path lengths through the optical systems of the distinct chromatic components, where the pre-selected relationship substantially compensates chromatic dispersion. The system can also include a switchable element such as a switchable grating, a switchable liquid crystal array, a switchable mirror array, a switchable cross-connect, an interleaver or a band channelizer. (Interleavers and Band Channelizers are systems that separate an array of input channels into even and odd channels or into bands of channels.)

For a better understanding of the present invention, together with other and further objects thereof, reference is made to the accompanying drawings and detailed description and its scope will be pointed out in the appended claims.

DETAILED DESCRIPTION OF THE INVENTION

In order to better understand the present invention described below, it should be noted that certain terms used in the description of the invention have been used interchangeably.

In the following descriptions of the present invention, the terms such as "light" and "optical radiation" may be used interchangeably, and these terms both include electromagnetic radiation over the entire spectrum of wavelengths such as, for example, ultraviolet, visible, and infrared. Also, the term "optical", for example, as applied to components and systems, refers not only to optical components and systems, but also to electro-optical components and systems.

Furthermore, terms such as "beams" and "channels" may also be interchanged, in certain instances, based upon their usage as recognized in the art. The terms "Switching/routing" system and "disperser/combiner" system may also be interchanged, in certain instances.

The systems and methods of this invention, described hereinbelow, substantially compensate the chromatic dispersion in switching/routing (disperser-combiner) optical systems.

Figure 1:
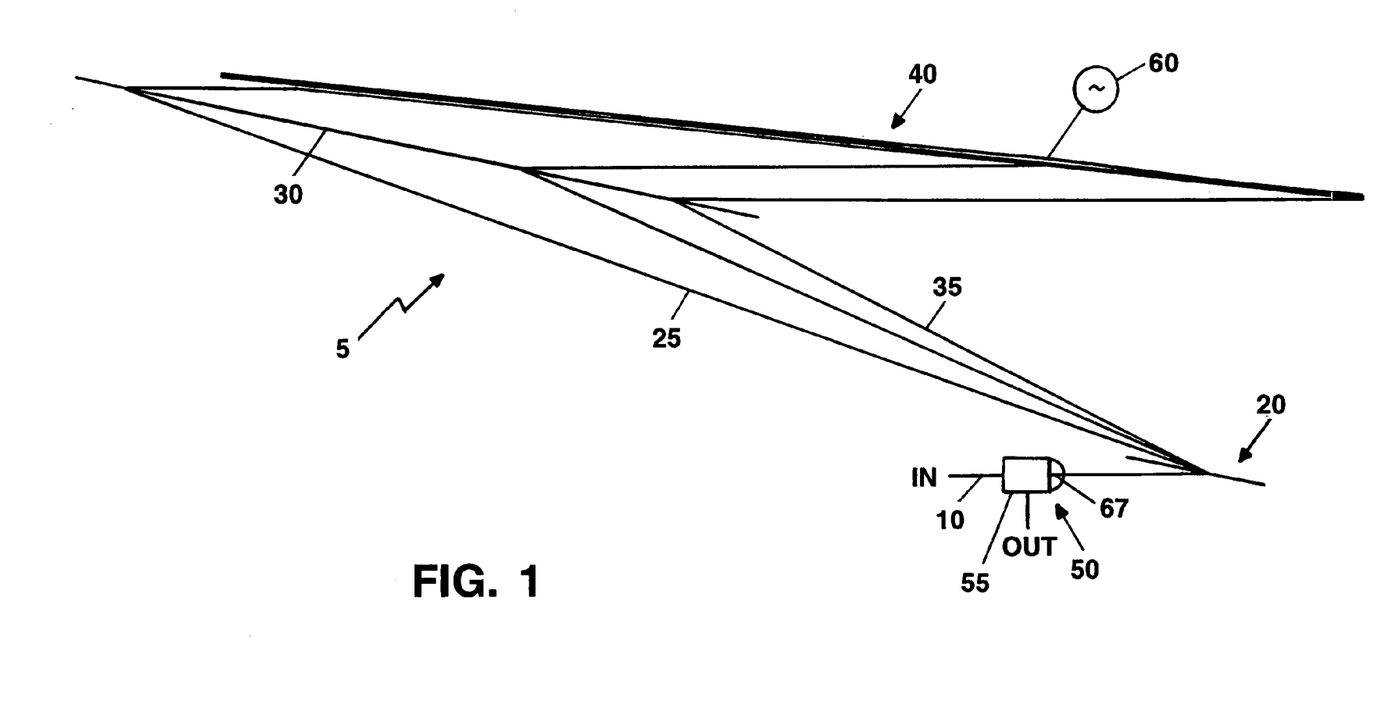
FIG. 1 is a schematic graphical representation of an embodiment of a system of this invention.

An embodiment of the method of this invention can be best understood by reference to FIG. 1. Referring to FIG. 1, in the optical system 5, input optical radiation 10 is separated into distinct chromatic components 25, 35 by fixed grating 20. The distinct chromatic components 25, 35 are directed towards a pixellated optical reflector 40 by fixed grating 30. Fixed gratings 20, 30 separate the distinct chromatic components 25, 35. The distinct chromatic components 25, 35 are reflected from the pixellated volume optical reflector 40.

The input 10 could be weakly focused onto the pixellated volume optical reflector 40 so that the neighboring distinct chromatic components are resolved while allowing for the input beam size to support the propagation distance. In one embodiment, this is accomplished with a cylindrical lens 67 since the distance to the mirror is roughly the same for all wavelengths. A spherical lens could also be used.

The distinct chromatic components 25, 35 in the reflected beam are converged towards fixed grating 20 by fixed grating 30. The recombining of the distinct chromatic components 25–35 in the reflected beam is completed by fixed grating 20. The combined beam 50 is the system output beam. Before reflecting from the pixellated volume optical reflector 40, grating 30 renders the chromatic components in the input parallel to each other and laterally dispersed. After reflecting from the pixellated volume optical reflector 40 (a holographic switchable mirror in one embodiment), the chromatic components are angularly converged by grating 30 toward grating 20, where grating 20 renders the chromatic components substantially parallel and combined. A redirecting optical component, such as a Circulator/Polarization Diversity Filter (PDF) 55, separates the input and output beams and decreases the polarization sensitivity of the system. (The PDF operates by splitting the input beam into two "twin" beams of orthogonal polarizations, rotating the polarization state of one of them so the twin beams propagate through the systems as identical polarization states, and upon exit restores the twin beams to orthogonal polarization states and recombines them.) The reflecting and propagating of the beams through the system 5 provides a pre-selected relationship between optical path lengths through the optical system 5 of the distinct chromatic components. That pre-selected relationship substantially compensates the chromatic dispersion. It should be noted that compensates, as used herein and hereinafter, includes not only substantially compensating for chromatic dispersion due to local path length differences but can also include compensating for chromatic dispersion introduced by the transmission that provides the input radiation 10. The pixellated volume optical reflector 40 could be shaped to provide local compensation by positioning the mirror such that the length of the path traveled by the chromatic components from grating 20 to the pixellated volume optical reflector 40 is substantially the same. The cylindrical lenses 67 can be used to substantially focus each chromatic component to a narrow region on pixellated volume optical reflector 40, thereby greatly reducing the wavelength dependent blur in optical path length. The width of the beam of any specific wavelength component blurs the desired path length at the center of that beam by introducing some paths longer and some shorter. The narrower the width of the beam in the dimension of the mirror tilt, the less this effect.

It should be noted that although two distinct chromatic components 25, 35 are identified a pre-selected number of components, other than two, can be utilized. It should also be noted that although, in the embodiment shown in FIG. 1, the same grating pair comprised of gratings 20, 30 performs both the separation and recombining functions, two distinct grating pairs could be used in a different embodiment. It should be further noted that the pixellated volume optical reflector 40 could be, but is not limited to, a switchable pixellated optical reflector such as a switchable pixellated holographic mirror. A switchable holographic mirror may be a device such as that disclosed in U.S. Pat. No. 5,771,320 (issued to T. W. Stone on Jun. 23, 1998), hereby incorporated by reference, and U.S. Pat. No. 6,072,923 (issued to T. W. Stone on Jun. 6, 2000), also hereby incorporated by reference.

If a switchable pixelated mirror, such as switchable pixelated volume holographic mirror, is used in the embodiment of FIG. 1, the embodiment represents a chromatically compensated switchable filter. Applying a signal to driver 60, which independently drives each of the volume mirror pixels in pixellated volume optical reflector 40 to "on" (reflecting) or "off" (transmitting) states, the distinct chromatic components that are reflected can be selected.

Still referring to FIG. 1, the method of operation of the chromatic compensating optical system 5 can be summarized as follows. First, the input optical radiation 10 is separated into distinct chromatic components 25, 35 by a pair of separating diffraction gratings, which constitute an embodiment of an optical separating system. The distinct chromatic components 25, 35 are propagated through the optical system 5. The propagation includes reflecting the distinct chromatic components 25, 35 from the pixellated switchable optical reflector 40. The reflecting provides a pre-selected relationship between optical path lengths through the optical system 5 of the distinct chromatic components 25, 35. The pre-selected relationship substantially compensates the chromatic dispersion. In one embodiment, the optical path length traversed by the chromatic components 25, 35 could be rendered substantially equal, as shown in FIG. 1. The distinct chromatic components 25, 35 are then recombined by the pair of recombining diffraction gratings 20, 30, which constitute an embodiment of an optical recombining system. In the embodiment of the optical system 5 shown in FIG. 1, the pair of recombining diffraction gratings 20, 30 is the same as the pair of separating diffraction gratings 20, 30.

Figure 2:
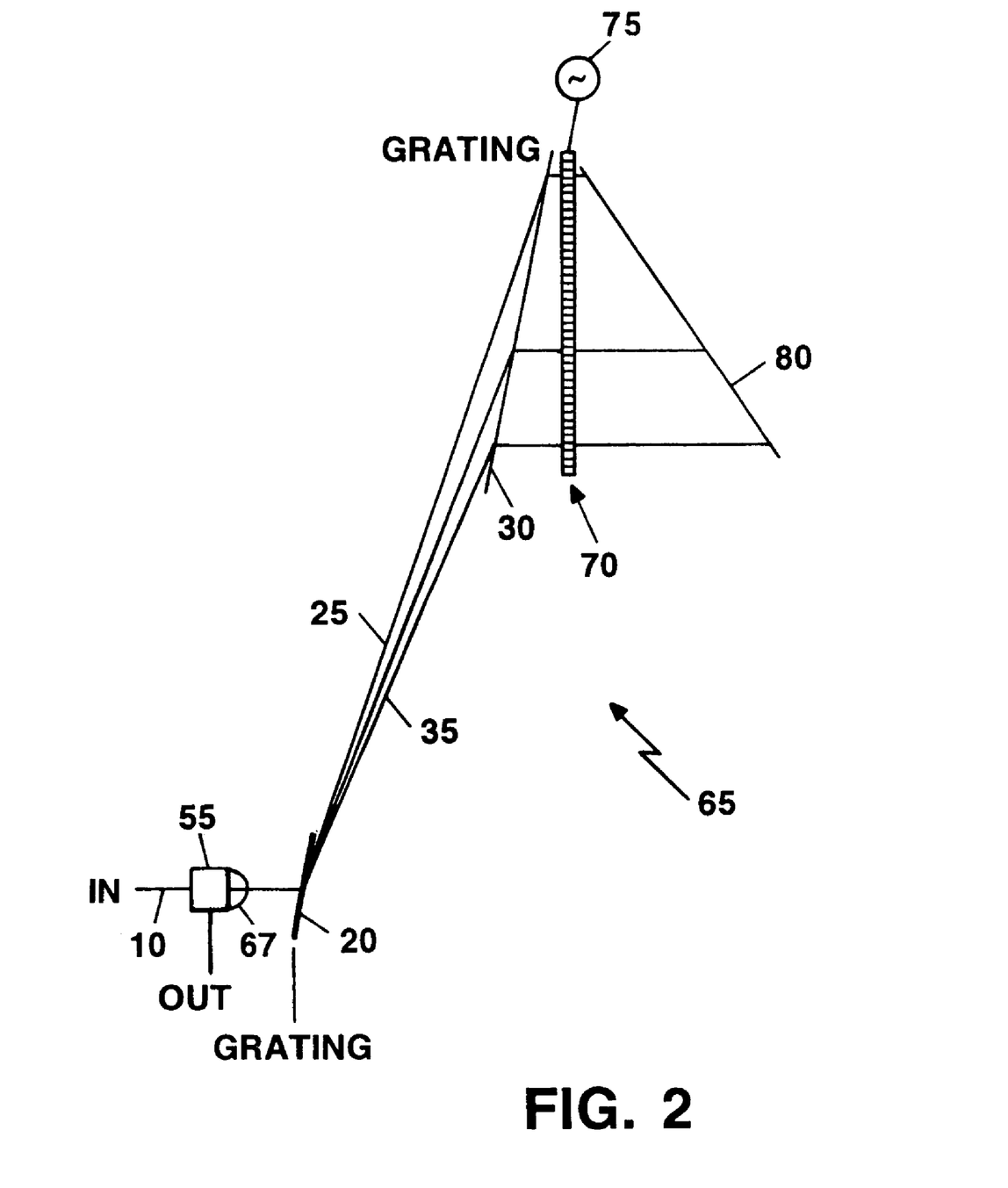
FIG. 2 is a schematic graphical representation of another embodiment of a system of this invention.

Another embodiment of a system of this invention is shown in FIG. 2. In FIG. 2, fixed volume holographic mirror 80 replaces the pixellated switchable volume optical reflector 40 of FIG. 1 and a pixellated switchable optical element 70 is inserted in the optical path between fixed grating 30 and the optical reflector 80. (Other embodiments of the volume optical reflector 80 include, but are not limited to a phase conjugate mirror.) During operation, the switchable optical element 70 receives and outputs the separated distinct chromatic components 25, 35. The switchable optical element 70 can be, but is not limited to, a switchable grating or a switchable liquid crystal array or a switchable mirror array. When the switchable optical element 70 is a switchable grating or a switchable liquid crystal array or a switchable mirror array or similar component, the embodiment 65 represents a chromatically compensated switchable filter. Applying a signal to driver 75, some distinct chromatic components are selected to be transmitted and other distinct chromatic components are selected to absorbed, deflected or scattered out of the optical path of the system 65.

The operation of the system 65 of FIG. 2 is similar to that of the system 5 of FIG. 1. Referring to FIG. 2, input optical radiation 10 is separated into distinct chromatic components 25, 35 by fixed grating 20. The distinct chromatic components 25, 35 are directed towards the switchable element 70 by the fixed grating 30. Fixed gratings 20, 30 separate the distinct chromatic components 25, 35. The distinct chromatic components 25, 35 are transmitted through the switchable element 70 and reflected from the fixed volume holographic mirror 80.

The input 10 could be weakly focused onto the fixed volume holographic mirror 80 as described earlier so that the neighboring distinct chromatic components are resolved while allowing for the input beam size to support the propagation distance. In one embodiment, this is accomplished with a cylindrical lens 67 since the distance to the mirror is roughly the same for all wavelengths. A spherical lens could also be used.

The reflected distinct chromatic components 25, 35 transmit again through switchable element 70 and are converged towards fixed grating 20 by fixed grating 30. The recombining of the reflected components distinct chromatic components 25, 35, is completed by fixed grating 20. The combined beam 50 is the system output beam. Circulator/PDF 55 separates the input and output beam. The reflecting and propagating through the system 65 provides a pre-selected relationship between optical path lengths through the optical system 65 of the distinct chromatic components. That pre-selected relationship substantially compensates the chromatic dispersion. Referring to FIG. 2, the volume holographic mirror 80 is positioned such that the lengths of the optical path traversed by the chromatic components 25, 35 could be rendered substantially equal. The fixed optical volume reflector 80 could be shaped or positioned to provide compensation for not only chromatic dispersion due to path length difference but also can be shaped or positioned to provide compensation for chromatic dispersion introduced by the transmission that provides the input radiation 10.

It should again be noted that although two distinct chromatic components 25, 35 are identified a pre-selected number of components, other than two, can be utilized.

Figure 3:
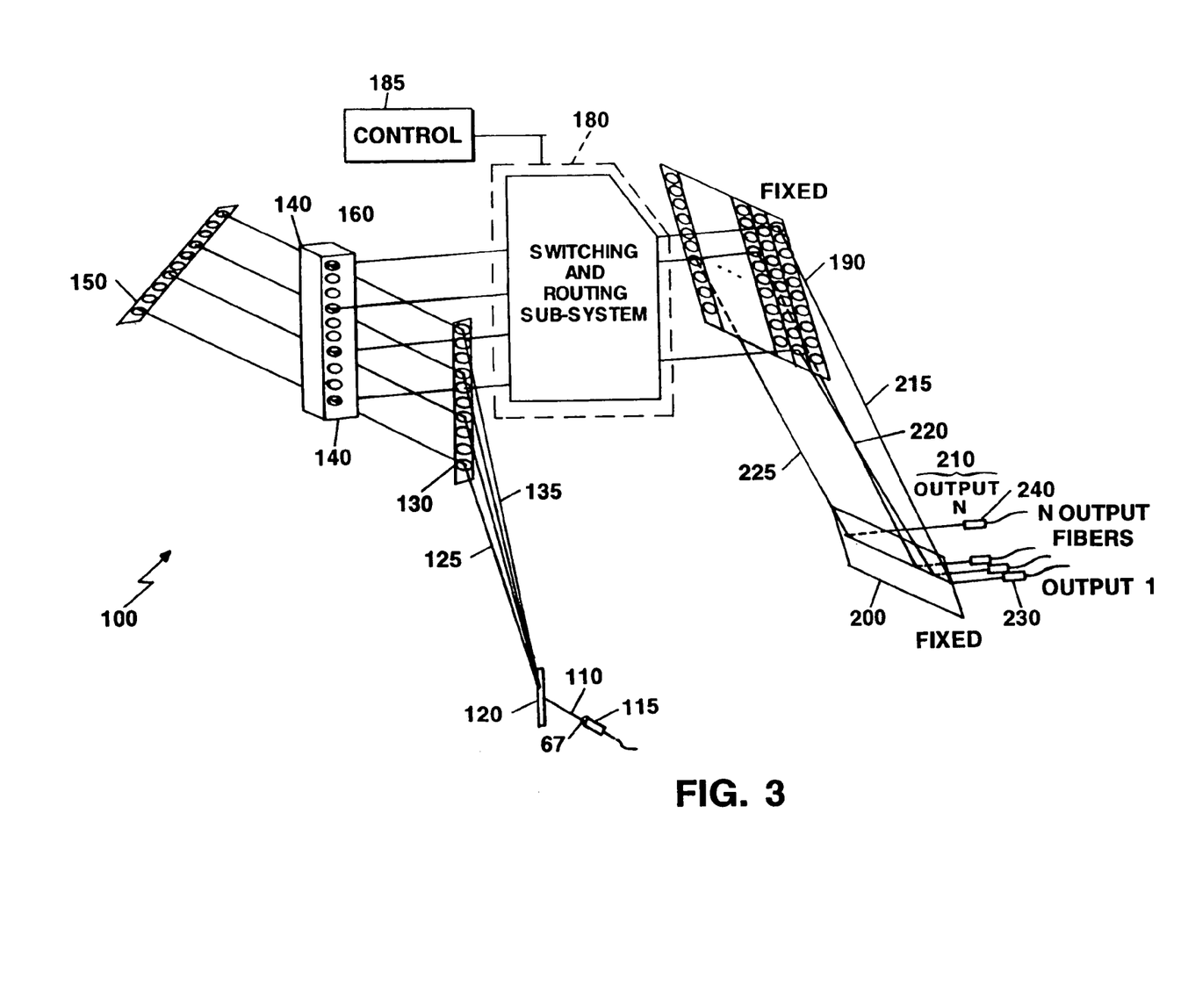
FIG. 3 is a schematic graphical representation of a further embodiment of a system of this invention.

A further embodiment of a system of this invention is shown in FIG. 3. Referring to FIG. 3, the system 100 includes a pair of separating diffraction gratings 120, 130, a directing optical element 140, such as, but not limited to, a polarizing beamsplitter with a quarter wave plate, a redirecting optical element 160, such as, but not limited to, the same polarizing beamsplitter used in the directing optical element 140 with another waveplate used to re-rotate the polarization state of the light, a volume optical reflector 150, a switchable optical element 180, optical means for focusing distinct chromatic components 125, 135 onto the switchable optical element 180, and a pair of recombining diffraction gratings 190, 200.

During operation, input optical radiation 110, from an input beam/port 115, is separated into m distinct chromatic components, labeled 125 through 135, by fixed grating 120. The distinct chromatic components 125, 135 are directed towards directing optical element 140. Directing optical element 140 directs the distinct chromatic components 125, 135 towards an optical reflector 150, a tilted holographic mirror in one embodiment. When a polarizing beamsplitter (PBS) is used in the directing optical element 140, the distinct chromatic components 125, 135 will be linearly polarized, transmitted through the PBS, through the waveplate, and as incident on the tilted holographic mirror will be circularly polarized. It should noted that an array of Faraday rotators or circulators may also be utilized as components of the directing optical element 140. If an array of circulators is used, other polarization states or unpolarized light may be used in the channels.

Lenses may be used to focus the neighboring distinct chromatic components on the volume holographic mirror 150 so that the chromatic components are spatially narrow in the dimension of the tilt. This minimizes the "blur" in spectrally dependent path lengths introduced by the mirror 150, and allows for the input beam size to support the desired propagation distance. In one embodiment, this is accomplished with a cylindrical lens 67 since the distance to the mirror is roughly the same for all wavelengths. Redirecting element 160 may contain microlens arrays or similar devices to focus or collimate the various spectral component beams for propagation through the rest of system 100. Alternatively these re-focusing lens arrays may be located at other locations throughout the system.

The distinct chromatic components 125, 135 are reflected by the optical reflector 150, a tilted holographic mirror in the embodiment shown. The reflected distinct chromatic components 125, 135 are redirected towards the switchable optical element 180 by redirecting optical element 160. Switchable optical element 180 receives distinct chromatic components 125, 135 and outputs among m×N distinct output components, labeled 215 through 225. The distinct output components 215 through 225 are converged towards fixed grating 200 by fixed grating 190. Each set of m distinct output chromatic components, labeled 220 through 225, is converged by fixed grating 200 into one of the N output beam-ports 210, which are individually labeled 230 through 240.

Figure 4:
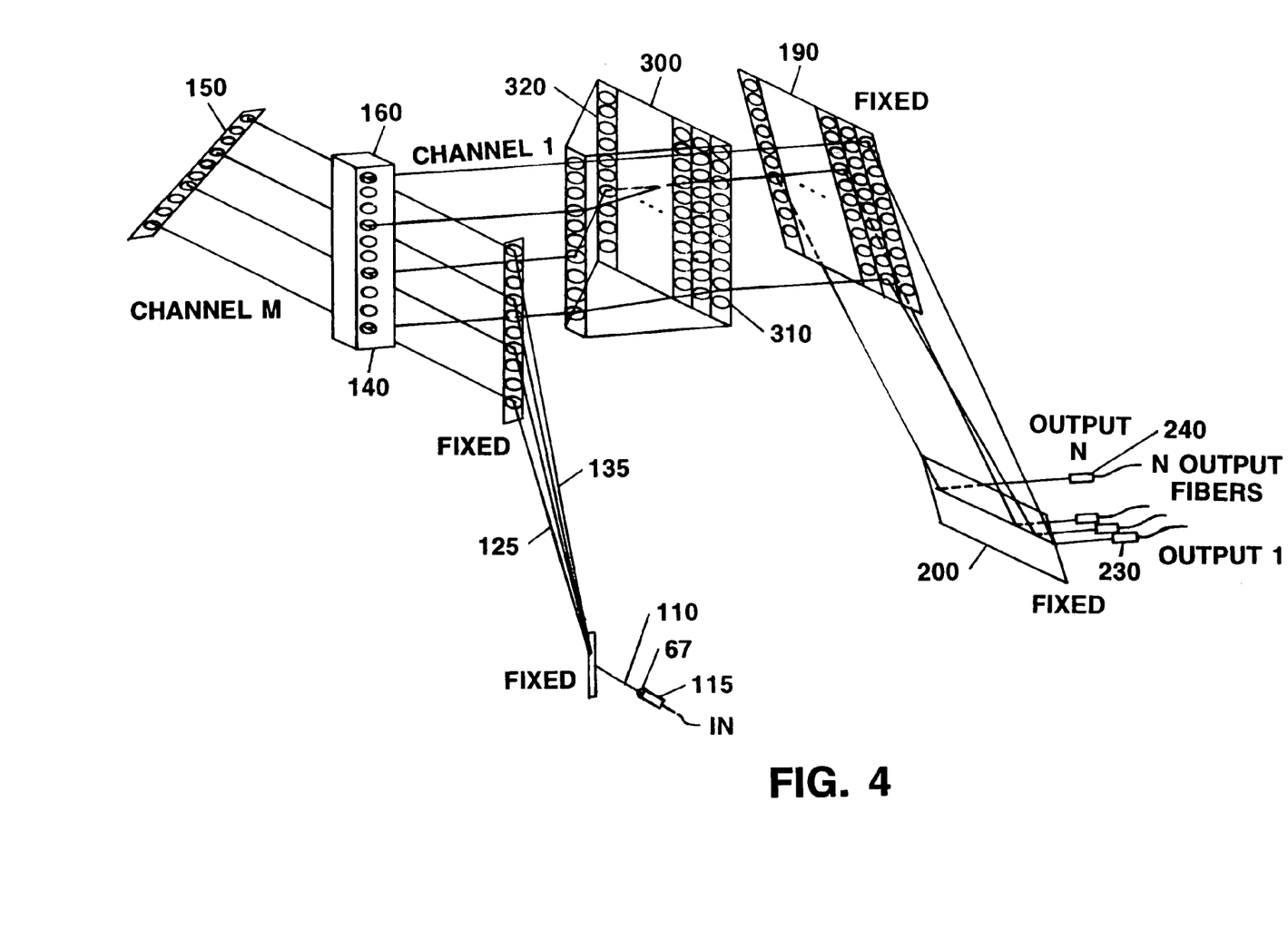
FIG. 4 is a schematic graphical representation of a detailed embodiment of the system of FIG. 3.

FIG. 4 depicts a switching and/or routing system 100 of this invention incorporating electrically switchable diffractive gratings, such as those disclosed in U.S. Pat. No. 5,771,320, as an embodiment of the switchable optical element 180 of FIG. 3. In one embodiment, the array of m 1×N switches 300 shown in FIG. 4 is the front half of the M×N cross connect as described in U.S. Pat. No. 5,771,320. In another embodiment, the array of m 1×N switches 300 comprises a compact planar switched grating array as described in U.S. patent application Ser. No. 10/700,828, filed on Nov. 4, 2003, which is hereby incorporated by reference. During operation, input optical radiation 110 is separated into m distinct chromatic components, labeled 125 through 135, by fixed grating 120. The distinct chromatic components 125, 135 are directed towards directing optical element 140. Directing optical element 140 directs the distinct chromatic components 125, 135 towards an optical reflector 150. The distinct chromatic components 125, 135 are reflected by the optical reflector 150. The reflected distinct chromatic components 125, 135 are redirected towards an array of m 1×N switches 300 by redirecting optical element 160. The distinct chromatic components 125, 135 are then passed through the array of m 1×N switches 300 as shown. Each of the m input channels 125 through 135 is independently routed to any of N output columns 310 through 320. The recombining grating pair 190 and 200 combines any chromatic components present in a given column into one element of an array of N multiplexed output channels as shown in FIG. 4. Each of m chromatic components, 125 through 135, in the input can be independently routed to any of N output ports, 230 trough 240. Similarly, a lens 67 or other lenses as described earlier may be used to focus or collimate the chromatic components onto the tilted volume mirror and/or throughout the system.

It should be noted that, while the above described embodiment of the system 100 of this invention utilizes electrically switchable diffractive gratings, other embodiments of the switchable optical element 180 are, but not limited to, switchable mirror arrays, switchable liquid crystal arrays. The switchable optical element 180 may be, but is not limited to, a cross-connect, an add-drop multiplexer, an interleaver or a band channelizer.

The methods of this invention can be utilized to chromatically compensate wavelength systems such as those disclosed in U.S. patent application Ser. No. 10/700,828, filed on Nov. 4, 2003.

Although the invention has been described with respect to various embodiments, it should be realized this invention is also capable of a wide variety of further and other embodiments within the spirit and scope of the appended claims.

What is claimed is:

1. A method for compensating for the chromatic dispersion in optical systems, the method comprising the steps of:
    separating input optical radiation into distinct chromatic components;
    propagating said distinct chromatic components through the optical system, said
    propagating including the steps of:
        reflecting said distinct chromatic components from a holographic mirror;
        providing, through said reflecting, a pre-selected relationship between optical path lengths of said distinct chromatic components, said pre-selected relationship substantially compensating for the chromatic dispersion; and,
        recombining said distinct chromatic components, after propagating through the optical system;
    in order to provide said pre-selected relationship, said holographic mirror has reflection properties different from a conventional mirror;
    in reflecting said distinct chromatic components, a direction of propagation of said distinct chromatic components being altered by means of diffraction by said holographic mirror;
    in reflecting said distinct chromatic components by means of diffraction, an angle of incidence does not equal an angle between a direction of propagation of said reflected distinct chromatic components and a normal to a surface of said holographic mirror at substantially a location of incidence, said reflected distinct chromatic components emanating from said surface.

2. The method of claim 1 wherein the step of reflecting said distinct chromatic components further comprises the step of:
    reflecting said distinct chromatic components from a switchable pixellated
    holographic mirror.

3. The method of claim 1 further comprising the step of: focusing the input optical radiation.

4. The method of claim 1 wherein the step of separating input optical radiation into distinct chromatic components comprises the step of:
    propagating the input optical radiation through at least one separating diffraction grating.

5. The method of claim 4 wherein the step of recombining said distinct chromatic components comprises the step of:
    propagating the distinct chromatic components through at least one recombining diffraction grating.

6. The method of claim 5 wherein said at least one recombining diffraction grating is the same as said at least one separating diffraction grating.

7. A chromatic dispersion compensated optical system comprising:
    an optical separating sub-system capable of separating input optical radiation into distinct chromatic components;
    an optical recombining sub-system capable of recombining said distinct chromatic components for output; and,
    a volume holographic mirror capable of reflecting said distinct chromatic components and providing, through said reflecting, a pre-selected relationship between optical path lengths through the optical systems of said distinct chromatic components, said pre-selected relationship substantially compensating chromatic dispersion; said volume holographic mirror being optically disposed between said optical separating sub-system and said optical recombining sub-system;
    in reflecting said distinct chromatic components, a direction of propagation of said distinct chromatic components being altered by means of diffraction by said holographic mirror;
    in reflecting said distinct chromatic components, a direction of propagation of said distinct chromatic components being altered by means of diffraction by said holographic mirror;
    in reflecting said distinct chromatic components by means of diffraction, an angle of incidence does not equal an angle between a direction of propagation of said reflected distinct chromatic components and a normal to a surface of said holographic mirror at substantially a location of incidence, said reflected distinct chromatic components emanating from said surface.

8. The optical system of claim 7 further comprising:
    a switchable element selected from the group consisting of a switchable grating, a switchable mirror array, a switchable liquid crystal array, a cross-connect, an add-drop multiplexer, an interleaver and a band channelizer;
    said switchable element optically interposed between said volume holographic mirror and said optical recombining sub-system.

9. The optical system of claim 7 further comprising:
    an optical focusing component capable of focusing separated input optical radiation onto said volume holographic mirror.

10. The optical system of claim 7 wherein said volume holographic mirror comprises a pixellated switchable holographic mirror.

11. The optical system of claim 7 wherein said optical recombining sub-system is the same as said optical separating sub-system.

12. The optical system of claim 8 further comprising:
    a directing optical element capable of directing the separated input optical radiation to said volume holographic mirror; and,
    a redirecting optical element capable of redirecting optical radiation reflected from said volume holographic mirror to the switchable element.

13. A chromatic dispersion compensated optical system comprising:
    a pair of separating diffraction gratings capable of separating input optical radiation into distinct chromatic components;
    a holographic mirror capable of reflecting said distinct chromatic components and providing, through said reflecting, a pre-selected relationship between optical path lengths of said distinct chromatic components through the optical system, said pre-selected relationship substantially compensating chromatic dispersion;
    a switchable element capable of receiving the separated distinct chromatic components and outputting separated distinct output chromatic components; and,
    a pair of recombining diffraction gratings capable of recombining said outputted separated distinct chromatic components;
    said switchable element being optically interposed between said holographic mirror and one of said pair of recombining diffraction gratings;

in reflecting said distinct chromatic components, a direction of propagation of said distinct chromatic components being altered by means of diffraction by said holographic mirror;

in reflecting said distinct chromatic components, a direction of propagation of said distinct chromatic components being altered by means of diffraction by said holographic mirror;

in reflecting said distinct chromatic components by means of diffraction, an angle of incidence does not equal an angle between a direction of propagation of said reflected distinct chromatic components and a normal to a surface of said holographic mirror at substantially a location of incidence, said reflected distinct chromatic components emanating from said surface.

14. The optical system of claim 13 wherein the switchable element comprises:

a switchable element selected from the group consisting of a switchable grating, a switchable mirror array, a switchable liquid crystal array, a cross-connect, an add-drop multiplexer, an interleaver and a band channelizer;

said switchable element optically interposed between said volume holographic mirror and said optical recombining sub-system.

15. The optical system of claim 13 further comprising:

an optical focusing component capable of focusing separated input optical radiation onto said holographic mirror.

16. The optical system of claim 13 wherein said pair of recombining diffraction gratings is the same as said pair of separating diffraction gratings.

17. The optical system of claim 8 further comprising:

a directing optical element capable of directing the separated input optical radiation to the volume holographic mirror;

a redirecting optical element capable of redirecting optical radiation reflected from the volume holographic mirror to the switchable element.

18. The optical system of claim 7 wherein said optical separating sub-system comprises:

a pair of diffraction gratings.

19. The optical system of claim 7 wherein said optical recombining sub-system comprises:

a pair of diffraction gratings.

20. The optical system of claim 7 wherein said volume holographic mirror comprises a phase conjugate mirror.

* * * * *

UNITED STATES PATENT AND TRADEMARK OFFICE
CERTIFICATE OF CORRECTION

PATENT NO. : 7,142,751 B2  Page 1 of 1
APPLICATION NO. : 10/717326
DATED : November 28, 2006
INVENTOR(S) : Thomas W. Stone It is certified that error appears in the above-identified patent and that said Letters Patent is hereby corrected as shown below:

Column 7, Line 27, Claim 1, delete "being" and insert -- is --;

Column 8, Line 8, Claim 7, delete "being" and insert -- is --;

Column 8, Line 10-13, Claim 7, after "mirror;" delete "in reflecting said distinct chromatic components, a direction of propagation of said distinct chromatic components being altered by means of diffraction by said holographic mirror;";

Column 9, Line 3, Claim 13, delete "being" and insert -- is --;

Column 9, Line 5-8, Claim 13, after "mirror;" delete "in reflecting said distinct chromatic components, a direction of propagation of said distinct chromatic components being altered by means of diffraction by said holographic mirror;".

Signed and Sealed this
Tenth Day of July, 2012

David J. Kappos
*Director of the United States Patent and Trademark Office*